United States Patent [19]

Nousak

[11] Patent Number: 4,548,069
[45] Date of Patent: Oct. 22, 1985

[54] PIPE TESTING TOOL
[75] Inventor: Matthew J. A. Nousak, Gray, La.
[73] Assignee: Damco Testers, Inc., Houma, La.
[21] Appl. No.: 488,694
[22] Filed: Apr. 26, 1983
[51] Int. Cl.[4] .............................................. G01M 3/28
[52] U.S. Cl. ........................................ 73/49.5; 73/49.1
[58] Field of Search ................... 73/40.5 R, 49.1, 49.5

[56] References Cited
U.S. PATENT DOCUMENTS

| | | | |
|---|---|---|---|
| 2,953,919 | 9/1960 | Potts | 73/49.5 |
| 2,955,458 | 10/1960 | Sonnier et al. | 73/40.5 R |
| 2,998,721 | 9/1961 | Gawlik | 73/40.5 R |
| 3,048,998 | 8/1962 | Gilreath | 73/40.5 R |
| 3,165,920 | 1/1965 | Loomis | 73/40.5 R |
| 3,199,598 | 8/1965 | Loomis | 73/40.5 R |
| 3,333,459 | 8/1967 | Claycomb | 73/40.5 R |
| 3,478,577 | 11/1969 | Hauk | 73/49.1 |
| 3,495,443 | 2/1970 | Phillips et al. | 73/40.5 |
| 3,503,249 | 3/1970 | Dumond | 73/49.1 |
| 3,712,115 | 1/1973 | Miller | 73/49.1 |
| 3,787,226 | 1/1974 | Iglehart et al. | 73/49.1 |
| 3,800,596 | 4/1974 | Phillips et al. | 73/40.5 R |
| 3,899,920 | 8/1975 | Matherne | 73/40.5 R |
| 4,081,990 | 4/1978 | Chatagnier | 73/40.5 R |
| 4,083,230 | 4/1978 | Rome, Sr. et al. | 73/40.5 R |
| 4,305,277 | 12/1981 | Ball et al. | 73/40.5 R |
| 4,322,969 | 4/1982 | Ball et al. | 73/40.5 R |

FOREIGN PATENT DOCUMENTS

| | | |
|---|---|---|
| 1242443 | 8/1971 | United Kingdom . |
| 2027909A | 2/1980 | United Kingdom . |
| 2055210A | 2/1981 | United Kingdom . |

Primary Examiner—Stewart J. Levy
Assistant Examiner—Hezron E. Williams
Attorney, Agent, or Firm—Fleit, Jacobson, Cohn & Price

[57] ABSTRACT

A pipe testing tool in the form of an elongated tubular member positionable within a pipe and which includes spaced, radially expandable sealing rings to contact the inner surface of the pipe and define at test section. The tool includes a through bore to carry pressurizing fluid which is used to cause the sealing rings to expand and then to pressurize the test section for leakage testing. A radial conduit from the through bore provides communication with a movable cylinder to compress the sealing rings and an escape chamber is provided to permit pressure release of trapped air between the cylinder and the sealing rings. The radial conduit is preferably spaced at least two conduit diameters away from a threaded portion to reduce stress concentrations and thereby avoid failure of the tool due to flexing during handling and use thereof.

13 Claims, 6 Drawing Figures

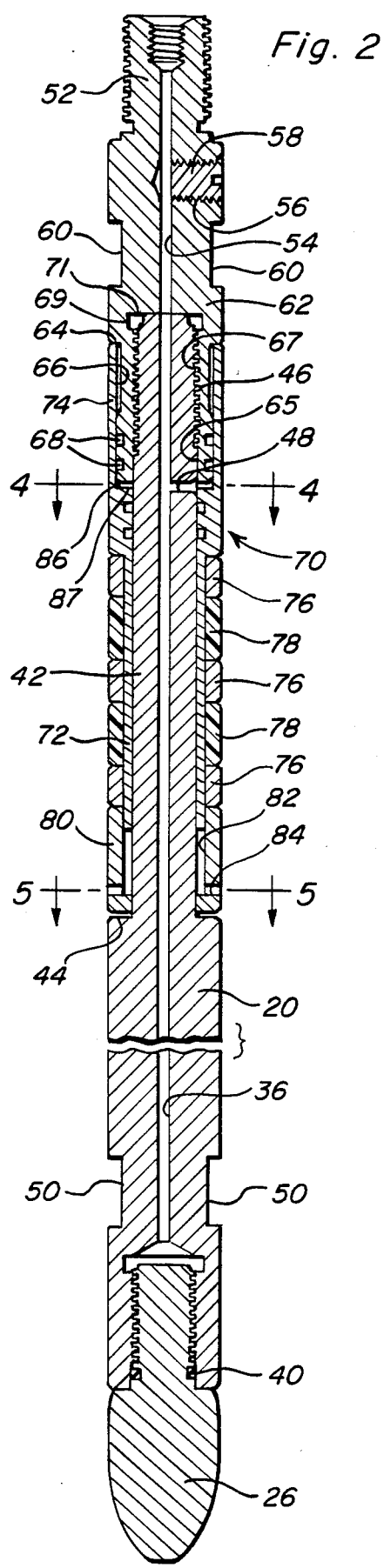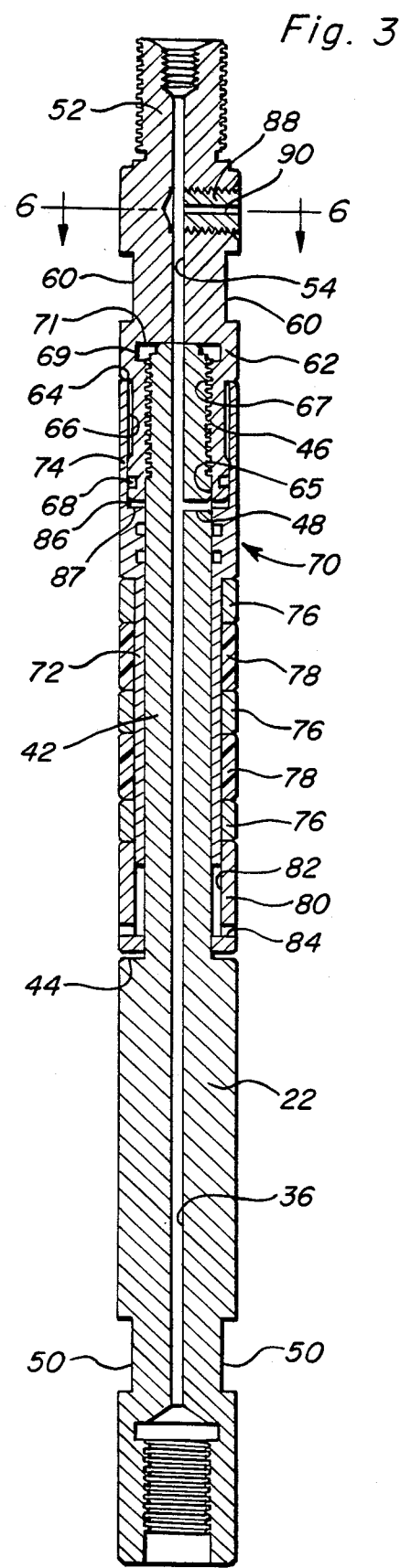

4,548,069

PIPE TESTING TOOL

BACKGROUND OF THE INVENTION

This invention relates to devices for leak testing of piping or tubing, and more particularly to a device for isolating an interior section of pipe or tubing to define a test section which can be subjected to pressure for the purpose of ascertaining the integrity of the section from the standpoint of leak tightness.

There are numerous instances in which sections of pipe or tubing are joined together and it is desired to check the connection to determine whether any leakage could occur. Among the fields in which such tubing is employed and in which fluid-tight interconnections between adjacent sections are desired is the oil and gas well drilling field. In that field, as the well bore is being drilled, various sections of tubing or pipe are lowered into the bore hole and connected to each other as the bore hole is drilled deeper. The pipe sections define a casing to prevent inward collapse of the bore hole and to permit withdrawal of the drilling fluids and debris, as well as to permit insertion and withdrawal of the drill head.

A number of devices have been developed in order to permit isolation of the piping section adjacent to a connection in order to define a restricted area within which a pressure test fluid can be introduced. Typically, such tools involve an elongated carrier member on which are positioned spaced packing rings which are expandable radially outwardly to contact the inner surfaces of the pipe on either side of the connection. The carriers on which the packing rings are positioned include passageways to permit the transmission of high pressure fluids from a pressure source to the space between the rings so that when the latter are expanded outwardly to define the axial limits of a test section, an enclosed volume is provided which includes the area to be tested as one surface thereof. Thus a pressurizable volume is provided to permit detection from the exterior of the pipe of any leakage which might take place at the area being tested.

Although a number of the prior art devices operate in a generally satisfactory manner, the slenderness and consequent flexibility of such devices results in high bending loads on the various tool sections during handling and use. A number of the prior art devices are prone to premature breakage or weakening because of stress cracks resulting from such loading conditions, and also from the high test pressures to which the devices are subjected, which can range from 5000 psi. to about 20,000 psi. It is therefore desirable to provide a pipe testing tool which is capable of quick and positive operation, and which can withstand high loading conditions to facilitate testing under high pressures while also being capable of withstanding the flexing loads to which such devices are oftentimes subjected in use.

SUMMARY OF THE INVENTION

It is an object of the present invention to provide a pipe testing tool which is of simplified construction and which provides maximum interchangeability of the several parts thereof.

It is another object of the present invention to provide a pipe testing tool in which the various portions are so connected that they are capable of withstanding significant pressure and mechanical loadings so that failure of the tools is minimized.

Briefly stated, in accordance with one aspect of the present invention, a pipe connection testing tool is provided which includes a cylindrical mandrel having a through bore to define an interior fluid passageway therein. Two such mandrels are interconnected by a union through a hub member which is carried by each of the mandrels. Positioned about the outer periphery of the mandrel is a sleeve which is capable of axial sliding movement relative thereto, and a plurality of spaced resilient sealing rings radially expandable upon application of axial compressive force. The sealing rings have rigid metallic drift rings positioned therebetween. A transverse passageway extends from the interior passageway in the mandrel to a shoulder formed in the cylinder sleeve, one end of which abuts one of the drift rings. When pressurized fluid is introduced into the inner bore of the mandrel the fluid causes the cylinder to act against the sealing rings and drift rings in an axial direction relative to the tool, thereby causing the sealing rings to compress axially, which causes their peripheral surfaces to move radially outwardly against the inner surface of the pipe or tubing to provide a fluid-tight seal therebetween. The space between the upper and lower sealing ring assemblies defines an annular test chamber which encompasses the pipe joint connection. When subjected to pressure the pressure is confined to the area of interest, and the pressure absence of the pressurizing fluid externally of the test section is observed to verify the integrity of the pipe connection at the test section.

BRIEF DESCRIPTION OF THE DRAWINGS

FIG. 2 is an enlarged cross-sectional view of the lower mandrel of a testing tool in accordance with the present invention.

FIG. 3 is an enlarged cross-sectional view similar to FIG. 2 but showing the upper mandrel of a testing tool in accordance with the present invention.

DESCRIPTION OF THE PREFERRED EMBODIMENTS

Figure 1:
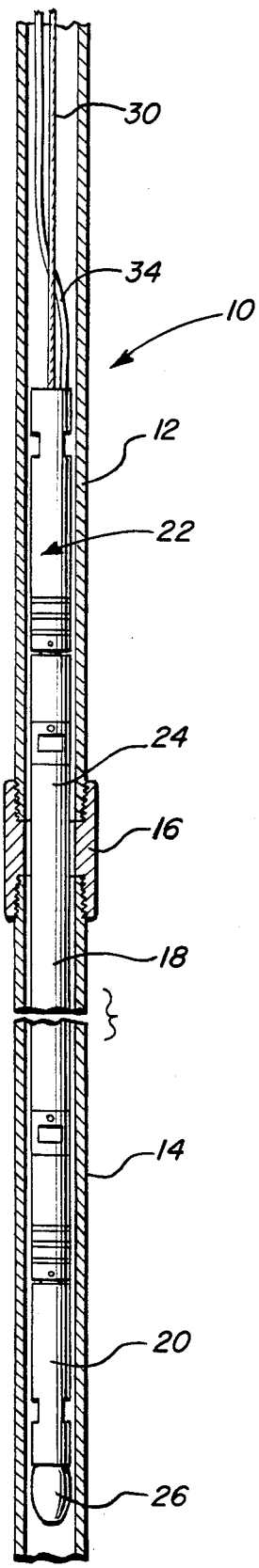
FIG. 1 is a side view of a pipe testing tool according to the present invention positioned within a pair of interconnected pipe sections to permit pressure testing of the joint therebetween.

Referring now to the drawings and in particular to FIG. 1 thereof, there is shown a portion of a well casing 10 including a junction defined by the ends of a first pipe section 12 and a second pipe section 14. Each pipe section includes an externally threaded end and the two pipe sections are interconnected by an internally threaded union 16 which is in threaded engagement therewith.

Positioned within the interior of casing 10 is a pipe testing tool 18 in accordance with the present invention. Tool 18 includes a lower cylindrical mandrel 20 and an upper cylindrical mandrel 22 coaxial therewith and connected thereto by means of an intermediate cylindrical spacer tube 24, which includes internal threads at each end thereof to permit a threaded connection with the respective mandrels. The lowermost end of lower mandrel 20, the end opposite spacer tube 24, includes a guide plug member 26 which has a rounded end to facilitate insertion of the tool into a pipe section. Connected to the upper end of upper mandrel 22, the end opposite spacer tube 24, is a lifting cable 30 to allow the tool to be raised and lowered in order to permit it to be placed in the desired position within casing 10. Also connected to the upper end of upper mandrel 22 is a fluid conduit 34 to permit communication between the interior of tool 18 and a source of pressurized fluid (not shown), which can be water, a gas, or a combination of gases.

The interior construction and interconnection of the several parts of lower mandrel 20 is illustrated in cross section in FIG. 2. As there shown, mandrel 20 is a generally tubular member and has a through bore 36 extending axially therethrough and includes means at one end for securing the guide plug 26, which also serves to close the lower portion of bore 36. Guide plug 26 can be threaded as shown and can include an internally recessed area within which a resilient O-ring 40 can be positioned for sealing purposes. The opposite end of mandrel 20 includes a coaxial, reduced diameter piston surface 42 which terminates in an outwardly extending shoulder 44 at one end thereof and in an external thread 46 at the outer end thereof. Thread 46 is preferably an Acme thread, for example a 1.000-8 Acme-3G thread, for increased strength and in order to minimize the stress concentration sites which frequently exist when a thread having a V-type cross section, such as a 1.000-8UNC-2A, is utilized. A radially directed conduit 48 is provided between thread 46 and shoulder 44 to permit communication between through bore 36 and piston surface 42. Conduit 48 is spaced axially inwardly from the end of thread 46 and is preferably no closer thereto than two conduit diameters in order to minimize stress concentrations at the thread root and thereby reduce the propensity for failure at that position, which was frequently experienced when using prior art devices wherein the radial conduit was adjacent the thread end and the thread was a V-type thread.

Positioned between shoulder 44 and guide plug 26 at the lower end of mandrel 20 is a pair of opposed parallel flats 50 formed on the outer surface of mandrel 20 to facilitate the interconnection of the several parts of the assembly by providing surfaces on which a wrench or other suitable turning tool can be applied to permit engagement of threads 46 with a suitable connecting member.

A generally tubular hub member 52 is threadedly secured to the upper end of mandrel 20, opposite the end which carries plug 26, and also has a through bore 54 therein which is in axial alignment with through bore 36 in mandrel 20. Hub 52 also has a transverse threaded passageway 56 which extends radially from through bore 54 to the exterior of hub member 52. As shown, passageway 56 in hub member 52 is closed by means of a plug 58. As on mandrel 20, hub member 52 also includes a pair of opposed parallel flats 60 formed in the outer surface to facilitate interconnection. Adjacent flats 60 is an enlarged diameter portion 62 which defines an external abutment 64 at the interconnection with a reduced diameter piston surface 66. Piston surface 66 is a highly polished finished surface which includes a pair of axially spaced peripheral recesses 68 adapted to receive sealing rings, such as O-rings (not shown). As shown, piston surface 66 does not extend beyond conduit 48.

Hub member 52 includes an enlarged inner bore 65 which is concentric with through bore 54 and which is positioned inwardly of piston surface 66. Bore 65 includes an internal Acme thread 67 which engages thread 46 on mandrel 20. Thread 67 extends only partially along bore 65 and commences at a point spaced inwardly of the end of hub 52 to provide a smooth cylindrical surface which overlies a portion of piston surface 42 of mandrel 20. Bore 65 extends inwardly to an end relief groove 69 which terminates in an inner transverse wall 71 to provide an abutment for the end of mandrel 20. End relief groove 69 is positioned intermediate the ends of enlarged diameter portion 62 and the relative sizes thereof are such that the minimum hub wall thickness therebetween is greater than the minimum hub wall thickness between piston surface 66 and thread 67 to minimize fracture failure caused by bending loads.

Slidably positioned on the outer periphery of piston surface 42 of mandrel 20 is a cylindrical sleeve 70 which is of a stepped configuration having a first cylinder 72 adapted to slidably overlie the periphery of piston surface 42 and having an overlapping cylindrical extension in the form of a second cylinder 74 and which overlies piston surface 66 on hub 52. Positioned about the outer periphery of first cylinder 72 is a plurality of spaced annular sealing rings 76 with a plurality of intermediate spaced annular drift rings 78 positioned coaxially with the sealing rings and adjacent the respective ends thereof. Sealing rings 76 are formed from a resilient material, which can be natural or synthetic rubber, plastics, elastomers, or the like. Drift rings 78 are relatively inflexible, preferably rigid, metallic materials, so that any axial deflection in the assembly of sealing rings and drift rings is reflected solely in sealing rings 76 and not in drift rings 78.

Also positioned around piston surface 42 is a sleeve-like escape chamber 80 which abuts the side of the lowermost sealing ring and which has an inner wall 82 spaced from piston surface 42 to define an annular space within which first cylinder 72 is received. One or more radial apertures 84 extends from the annular space in order to permit escape of air when first cylinder 72 is moved axially toward plug 26.

Figure 4:
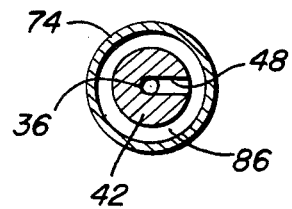
FIG. 4 is a cross-sectional view taken along the line 4—4 of FIG. 2.
Figure 5:
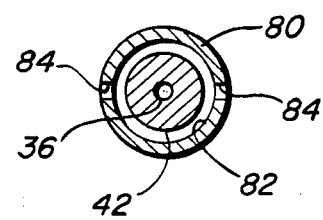
FIG. 5 is a cross-sectional view taken along the line 5—5 of FIG. 2.
Figure 6:
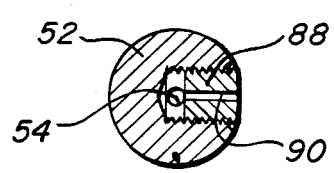
FIG. 6 is a cross-sectional view taken along the line 6—6 of FIG. 3.

The length of second cylinder 74 of sleeve 70 is such that when the uppermost end thereof is touching abutment 64, an annular space 86 (see FIG. 4) is provided between the lower end of hub 52 and an interior land 87 of sleeve 70 and is in communication with the radially extending conduit 48.

Upper mandrel 22 is of the same construction as lower mandrel 20 and like numerals identify like parts. However, instead of plug 58 as in lower mandrel 20, hub 52 of upper mandrel 22 includes a flow constriction in radially extending passageway 56. The constriction can be in the form of a plug 88 having an aperture 90 therein, the aperture preferably having a cross-sectional area substantially smaller than that of through bore 54 in hub 52.

Spacer tube 24, providing the interconnection between the respective hubs of upper mandrel 22 and lower mandrel 20, can be of any axial length desired, depending upon whether a single pipe connection joint is to be tested or a plurality of the same are to be tested, or even whether an entire pipe section between joints is to be tested for some particular reason.

Tube 24 is a hollow cylinder having internal threads at each end adapted to engage the external threads on hubs 52. Again, an Acme thread is preferred for improved resistance to failure caused by stress concentrations.

The material from which the mandrels and hubs are preferably made is a high strength nickel-cobalt-chromium-molybdenum super-alloy designated MP35N, rather than the 4340HT and 4140HT still previously used. That super-alloy was found to provide the mechanical properties of extremely high yield strength, adequate elongation, and high fatigue resistance necessary to minimize failure of the parts subjected to tensile loading and fatigue cycling. Sleeves 70 can be made from 17-4-PH stainless steel; drift rings 78 can be made from 304 stainless steel; and plug 26 can be made from cold-rolled carbon steel.

The assembly of the testing tool is accomplished by interconnecting lower mandrel 20, as it is shown in FIG. 2, with spacer tube 24 by threading the latter thereto at hub 52, and thereafter, corresponding hub 52 of upper mandrel 22 is threadedly interconnected with the opposite end of spacer tube 24. Fluid conduit 34 is then connected to a suitable fitting (not shown) at the upper end of upper mandrel 22.

In use, assembled tool 18 is lowered into casing 10 by means of cable 30 to a point where the respective sealing rings of the upper and lower mandrels are on opposite sides of a joint, as illustrated in FIG. 1. A pressurized fluid is introduced to the interior of the tool through fluid connection 34 and through bores 36, 54 and acts through conduits 48 to cause the respective sleeves 70 to move in opposite directions relative to each other, toward the respective sealing rings 76, causing compression of the sealing rings radially outward expansion thereof into sealing engagement with the interior surface of casing 10.

Because the area of aperture 90 in hub member 52 associated with upper mandrel 22 is less than that of through bores 36 and 54 in the respective mandrels and hubs, the initial flow of fluid is confined to the mandrels and serves to force sleeves 80 axially against their associated sealing rings. When the latter have been expanded into tight engagement with the interior surface of the pipe, the pressure within the tool increases to the point where flow of pressurizing fluid occurs through aperture 90 and enters the annular space which is defined between the upper and lower sealing ring assemblies. Once a steady-state condition has been achieved, the pressure within the annular chamber can be monitored and any decay in pressure, which would indicate a fluid leak at the connection, would be reflected at the source of pressurized fluid and would signal the operator that repair of the joint assembly was necessary. Similarly, if desired, external indications of leakage can be provided and any of a number of sensing arrangements can be used to sense such leakage at the exterior of the connection joint.

While particular embodiments of the present invention have been illustrated and described, it will be apparent to those skilled in the art that various changes and modifications can be made without departing from the spirit and scope of the present invention, and it is intended to encompass in the appended claims all such changes and modifications which fall within the scope of the present invention.

What is claimed is:

1. A pipe testing tool comprising an elongated member having a plurality of spaced, resilient, radially expandable sealing rings and having compression means including a sleeve surrounding said elongated member and adjacent said sealing rings for axially compressing said sealing rings to cause radial expansion thereof, said tool including a pair of spaced cylindrical mandrels each having a through bore and including a reduced diameter portion on which said sleeve is slidably carried, an external shoulder intermediate the ends of each of said mandrels to define an annular abutment for said sealing rings, an external thread positioned on the outer surface of an outer end of said mandrels and a laterally-extending pressurizing passageway adjacent to but axially spaced from said thread and providing communication between said through bore and said reduced diameter portion, and a hub member threadedly secured to one end of each of said mandrels, each said hub member having a through bore in communication with the through bores of said mandrels and including a threaded internal bore for threaded engagement with the external thread of an associated mandrel, said threaded internal bore including an unthreaded inner end terminating in an inner transverse wall and defining an annular end relief groove extending from said transverse wall and having an axial length defined by the distance between said inner transverse wall and the inner end of said thread, said end relief groove extending radially outwardly beyond said thread in said bore, said hub member including an external cylindrical surface, said sleeve overlapping and in sealing engagement with said cylindrical surface, and an enlarged outer diameter portion at the axial location of said end relief groove for limiting axial movement of said sleeve relative to said hub member, the minimum hub wall thickness between said enlarged diameter portion and said end relief groove being greater than the minimum hub wall thickness at said internal thread.

2. The pipe testing tool of claim 1 including an Acme thread at the interconnections between the mandrels and the hub members.

3. The pipe testing tool of claim 2 wherein both the upper and lower mandrel members have the same configuration.

4. The pipe testing tool of claim 1 wherein said pressurizing passageway is spaced at least two passageway diameters from said threaded area of said mandrel.

5. The pipe testing tool of claim 1 wherein the depth of the internal bore in said hub is greater than the maximum axial overlap in the axial direction between said sleeve and said hub.

6. The pipe testing tool of claim 5 wherein said means for radially expanding said resilient sealing rings include metallic drift rings positioned therebetween.

7. The pipe testing tool of claim 6 including an escape chamber adjacent said sealing rings for permitting escape of air when said sleeve moves toward said sealing rings.

8. A pipe testing tool comprising a pair of spaced apart cylindrical mandrels having a reduced diameter piston surface with a thread at its end, each of the mandrels having a shoulder formed intermediate its length, each of the mandrels having a through bore, each of the mandrels having a radially extending passageway adjacent to and spaced from the threaded portion of the reduced diameter piston surface and providing communication between said through bore and said piston surface, a pair of hub members each associated with one of the mandrels, each of the hub members having a thread at one end, each of the hub members being threadedly secured by its thread to one end of the mandrel, each of the hub members having a through bore and a shoulder, a pair of sleeves each slidably mounted on one of the mandrels, each sleeve having a first cylinder portion slidingly engaging the reduced diameter piston surface of the mandrel and a second cylinder portion slidingly engaging one said hub member and adapted to abut against the shoulder of the hub member, an annular space being provided between the end of the hub member having the thread and the sleeve, the annular space being in communication with the radially extending passageway, annular sealing rings positioned about the outer periphery of the first cylinder portion of the sleeve, the sealing rings positioned to abut a shoulder of the sleeve, one of the mandrels having an aperture therein, and means for introducing a pressurized fluid to the interior of the tool through the through bores and radially extending passageways to cause the respective sleeves to radially outwardly expand the sealing rings into sealing engagement with the interior surface of a pipe and to permit pressurizing fluid to flow through the aperture into an annular space defined between the sealing rings of the respective mandrels.

9. A pipe testing tool comprising a pair of spaced apart cylindrical mandrels having a thread at one end and a reduced diameter piston surface with a thread at the other end, each of the mandrels having a shoulder formed intermediate its length, each of the mandrels having a through bore, each of the mandrels having a laterally extending passageway adjacent to and spaced from the threaded portion of the reduced diameter piston surface and providing communication between said through bore and said piston surface, a pair of hub members each associated with one of the mandrels, each of the hub members having a thread at one end, each of the hub members being threadedly secured by its thread to one end of the mandrel, each of the hub members having a through bore and an external shoulder positioned outwardly of the mandrel, a pair of sleeves each slidably mounted on one of the mandrels, each sleeve having a first cylinder portion slidingly engaging the reduced diameter piston surface of the mandrel and a second cylinder portion slidingly engaging a one said hub member and adapted to abut against the shoulder of the hub member, the length of the second cylinder portion of each of the sleeves being such that when the second cylinder portion abuts the shoulder of the hub member an annular space is provided between the end of the hub member having the thread and the sleeve and the annular space is in communication with the laterally extending passageway, annular sealing rings positioned about the outer periphery of the first cylinder portion of the sleeve, the sealing rings positioned to abut a shoulder of the sleeve, a plug in one of the mandrels having an outlet means therein, and means for introducing a pressurized fluid to the interior of the tool through the through bores and laterally extending passageways to cause the respective sleeves to move in opposite directions relative to each other toward the respective sealing rings causing compression of the sealing rings and radially outward expansion thereof into sealing engagement with the interior surface of a pipe and, once the sealing rings are expanded into tight engagement with an interior surface of the pipe, to permit pressurizing fluid to flow through the plug into an annular space defined between the sealing rings of the respective mandrels.

10. A pipe testing tool comprising a pair of spaced apart cylindrical mandrels having an internal thread at one end and a reduced diameter piston surface with an external thread at the other end, each of the mandrels having a shoulder formed by the reduced diameter piston surface, each of the mandrels having a through bore, each of the mandrels having a radially extending passageway spaced from the externally threaded portion of the reduced diameter piston surface intermediate the externally threaded portion of the reduced diameter piston surface and the shoulder formed by the reduced diameter piston surface, the radially extending passageway being substantially perpendicular to the through bore of the respective mandrel and providing communication between said through bore and said piston surface, a pair of hub members each associated with one of the mandrels, each of the hub members having an external thread at one end and an internal thread at the other end, each of the hub members being threadedly secured by its internal thread to one end of the mandrel, each of the hub members having a through bore and an external shoulder positioned outwardly of its associated mandrel, a pair of sleeves each slidably mounted on one of the mandrels, each sleeve having a first cylinder portion slidingly engaging the reduced diameter piston surface of the mandrel and a second cylinder portion slidingly engaging a hub member and adapted to abut against the shoulder of the hub member, the length of the second cylinder portion of each of the sleeves being such that when the second cylinder portion abuts the shoulder of the hub member an annular space is provided between the end of the hub member having the internal thread and the sleeve and the annular space is in communication with the radially extending passageway, annular sealing rings positioned about the outer periphery of the first cylinder portion of the sleeve, the sealing rings positioned to abut a shoulder formed between the first and second cylinder portions of the sleeve, a plug in one of the mandrels having an aperture therein providing communication between said through bore of the hub member and the exterior of the hub member, and means for introducing a pressurized fluid to the interior of the tool through the through bores and radially extending passageways to cause the respective sleeves to move in opposite directions relative to each other toward the respective sealing rings causing compression of the sealing rings and radially outward expansion thereof into sealing engagement with the interior surface of a pipe and, once the sealing rings are expanded into tight engagement with an interior surface of the pipe, to permit pressurizing fluid to flow through the plug into an annular spaced defined between the sealing rings of the respective mandrels.

11. A pipe testing tool comprising a pair of spaced apart cylindrical mandrels having a reduced diameter piston surface with a thread at its end, each of the mandrels having a shoulder formed intermediate its length, each of the mandrels having a through bore, each of the mandrels having a radially extending passageway adjacent to and spaced from the threaded portion of the reduced diameter piston surface and providing communication between said through bore and said piston surface, a pair of hub members each associated with one of the mandrels, each of the hub members having a thread at one end, each of the hub members being threadedly secured by its thread to one end of the mandrel, each of the hub members having a through bore and a shoulder, a pair of sleeves each slidably mounted on one of the mandrels; each sleeve having a first cylinder portion slidingly engaging the reduced diameter piston surface of the mandrel and a second cylinder portion slidingly engaging one said hub member and adapted to abut against the shoulder of the hub member, an annular space being provided between the end of the hub member having the thread and the sleeve, the annular space being in communication with the radially extending passageway, annular sealing rings positioned about the outer periphery of the reduced diameter piston surface of the mandrel, the sealing rings positioned to abut a shoulder of the sleeve, one of the mandrels having an aperture therein, and means for introducing a pressurized fluid to the interior of the tool through the through bores and radially extending passageways to cause the respective sleeves to radially outwardly expand the sealing rings into sealing engagement with the interior surface of a pipe and to permit pressurizing fluid to flow through the aperture into an annular space defined between the sealing rings of the respective mandrels.

12. The pipe testing tool of claim 11 wherein the radially extending passageway is axially spaced from the thread on the hub by at least two passageway diameters.

13. The pipe testing tool of claim 11 wherein the thread of the hub members is an internal thread formed on an internal bore of said hub members and the thread of the mandrels is an external thread, said threaded internal bore including an unthreaded inner end terminating in an inner transverse wall and defining an annular end relief groove extending from said transverse wall and having an axial length defined by the distance between said inner transverse wall and the inner end of said thread, said end relief groove extending radially outwardly beyond said thread in said bore, said hub member including an external cylindrical surface, said sleeve overlapping and in sealing engagement with said cylindrical surface, and an enlarged outer diameter portion at the axial location of said end relief groove for limiting axial movement of said sleeve relative to said hub member, the minimum hub wall thickness between said enlarged diameter portion and said end relief groove being greater than the minimum hub wall thickness at said internal thread.

* * * * *